(12) United States Patent
Chakra et al.

(10) Patent No.: US 10,674,224 B2
(45) Date of Patent: Jun. 2, 2020

(54) ADAPTIVE PACKAGING AND DISTRIBUTION OF CHANNELS

(71) Applicant: International Business Machines Corporation, Armonk, NY (US)

(72) Inventors: Al Chakra, Apex, NC (US); Jonathan Dunne, Dungarvan (IE); Paul B. French, Cork (IE); James P. Galvin, Jr., Georgetown, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/804,457

(22) Filed: Nov. 6, 2017

(65) Prior Publication Data

US 2019/0028775 A1     Jan. 24, 2019

Related U.S. Application Data

(63) Continuation of application No. 15/655,426, filed on Jul. 20, 2017.

(51) Int. Cl.
*H04N 21/6405* (2011.01)
*H04N 21/643* (2011.01)
(Continued)

(52) U.S. Cl.
CPC ...... *H04N 21/6405* (2013.01); *H04H 20/423* (2013.01); *H04H 20/82* (2013.01);
(Continued)

(58) Field of Classification Search
CPC ............. H04N 21/6405; H04N 21/234; H04N 21/2365; H04N 21/438; H04N 21/4532;
(Continued)

(56) References Cited

U.S. PATENT DOCUMENTS

| 8,516,529 B2 | 8/2013 | Lajoie et al. |
| 2003/0135605 A1 * | 7/2003 | Pendakur ............... H04N 7/173 709/224 |

(Continued)

FOREIGN PATENT DOCUMENTS

| WO | 2007082165 A2 | 7/2007 |
| WO | 2011014498 A1 | 2/2011 |
| WO | 2012102651 A1 | 8/2012 |

OTHER PUBLICATIONS

List of IBM Patents or Patent Applications Treated as Related (Appendix P); Filed Nov. 6, 2017, 2 pages.
(Continued)

*Primary Examiner* — Chenea Davis
(74) *Attorney, Agent, or Firm* — Cantor Colburn LLP; Teddi Maranzano

(57) ABSTRACT

A method includes receiving, by a processor, metrics relating to a plurality of program channels. The plurality of program channels are distributed via at least one multicast stream. The method also includes modifying, by the processor, the at least one multicast stream. The modifying is based at least on the received metrics, and the modifying changes which programs are distributed via the at least one multicast stream. The method also includes transmitting at least one program channel via the modified at least one multicast stream.

7 Claims, 7 Drawing Sheets

(51) Int. Cl.
| | |
|---|---|
| H04L 29/06 | (2006.01) |
| H04N 21/2365 | (2011.01) |
| H04N 21/234 | (2011.01) |
| H04N 21/438 | (2011.01) |
| H04N 21/45 | (2011.01) |
| H04N 21/466 | (2011.01) |
| H04H 20/42 | (2008.01) |
| H04H 60/66 | (2008.01) |
| H04N 21/266 | (2011.01) |
| H04H 20/82 | (2008.01) |

(52) U.S. Cl.
CPC ........... *H04H 60/66* (2013.01); *H04L 65/403* (2013.01); *H04L 65/4076* (2013.01); *H04L 65/601* (2013.01); *H04N 21/234* (2013.01); *H04N 21/2365* (2013.01); *H04N 21/266* (2013.01); *H04N 21/438* (2013.01); *H04N 21/4532* (2013.01); *H04N 21/466* (2013.01); *H04N 21/64322* (2013.01)

(58) Field of Classification Search
CPC ............ H04N 21/466; H04N 21/64322; H04L 65/601
See application file for complete search history.

(56) References Cited

U.S. PATENT DOCUMENTS

| | | | |
|---|---|---|---|
| 2007/0061831 | A1 | 3/2007 | Savoor et al. |
| 2008/0134249 | A1 | 6/2008 | Yang et al. |
| 2009/0073909 | A1* | 3/2009 | Cai ...................... H04L 12/189 370/312 |
| 2013/0219418 | A1 | 8/2013 | Roh |
| 2013/0282899 | A1 | 10/2013 | Kullos |
| 2016/0227266 | A1* | 8/2016 | Shaw .................... H04N 21/251 |
| 2017/0353744 | A1* | 12/2017 | Kunisetty ........ H04N 21/23109 |

OTHER PUBLICATIONS

Al Chakra, et al. "Adaptive Packaging and Distributions of Channels," U.S. Appl. No. 15/655,426, filed Jul. 20, 2017.
Funabiki et al. "Compact tree plus algorithms for application-level multicast communications in multihome networks." 13th IEEE Int'l Conference on Networks Jointly held with 2005 IEEE 7th Malaysia Int'l Conf on Communic, 2005, pp. 139.
Park et al. "Mobile IPTV—Approaches, Challenges, Standards, and QoS Support," IEEE Computer Society, May/Jun. 2009, pp. 23-31.
Tan et al. "MeshTree: A Delay-optimised Overlay Multicast Tree Building Protocol," 2005, 11th International Conference on Parallel and Distributed Systems (ICPADS'05), vol. 2, pp. 1-12.
Wikipedia "MPEG transport stream," Last edited on Jun. 5, 2017, Retrieved Jul. 19, 2017, from https://en.wikipedia.org/wiki/MPEG_transport_stream, 10 pages.
Xiao "Internet protocol television (IPTV): The Killer application for the next-generation internet," IEEE Communication-Magazine, Nov. 2007, pp. 126-134.
Young Lee et al. "Reducing Channel Zapping Time in IPTV Based on User's Channel Selection Behaviors." IEEE Transactions on Broadcasting, vol. 56, Issue 3, Sep. 2010, 11 pages.
Zhang et al. "QoS/QoE techniques for IPTV transmissions." Mitsubishi Electric Research Laboratories, TR2009-010, Aug. 2009, 8 pages.

* cited by examiner

US 10,674,224 B2

ADAPTIVE PACKAGING AND DISTRIBUTION OF CHANNELS

DOMESTIC PRIORITY

This application is a continuation of U.S. application Ser. No. 15/655,426, filed Jul. 20, 2017, the contents of which are incorporated by reference herein in its entirety.

BACKGROUND

The present invention generally relates to adaptive packaging and distribution of channels, and more specifically, to adaptive packaging and distribution of channels for implementing internet protocol television and/or video conferencing technologies.

Internet Protocol television (IPTV) generally relates to the distribution of television programs using data transmissions that are relayed using internet protocol communication, as opposed to using traditional terrestrial, satellite, and/or cable signals. With IPTV, television programs can be continuously streamed to viewers. Video conferencing generally refers to technologies that enable receiving and transmitting of audio/video signals by different participants of the conference.

SUMMARY

Embodiments of the present invention are directed to a computer-implemented method for adaptive packaging and distribution of channels. A non-limiting example of the computer-implemented method includes receiving, by a processor, metrics relating to a plurality of program channels. The plurality of program channels are distributed via at least one multicast stream. The method also includes modifying, by the processor, the at least one multicast stream. The modifying is based at least on the received metrics. The modifying changes which programs are distributed via the at least one multicast stream. The method also includes transmitting at least one program channel via the modified at least one multicast stream.

Embodiments of the present invention are directed to a system for adaptive packaging and distribution of channels. A non-limiting example of the system includes a memory. The system also includes a processor system communicatively coupled to the memory. The processor system is configured to perform a method including receiving metrics relating to a plurality of program channels. The plurality of program channels are distributed via at least one multicast stream. The method also includes modifying the at least one multicast stream. The modifying is based at least on the received metrics, and the modifying changes which programs are distributed via the at least one multicast stream. The method also includes transmitting at least one program channel via the modified at least one multicast stream.

Embodiments of the invention are directed to a computer program product for adaptive packaging and distribution of channels, the computer program product comprising a computer readable storage medium having program instructions embodied therewith. The program instructions are executable by a processor to cause the processor to perform a method. A non-limiting example of the method includes receiving metrics relating to a plurality of program channels. The plurality of program channels are distributed via at least one multicast stream. The method also includes modifying the at least one multicast stream. The modifying is based at least on the received metrics, and the modifying changes which programs are distributed via the at least one multicast stream. The method also includes transmitting at least one program channel via the modified at least one multicast stream.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
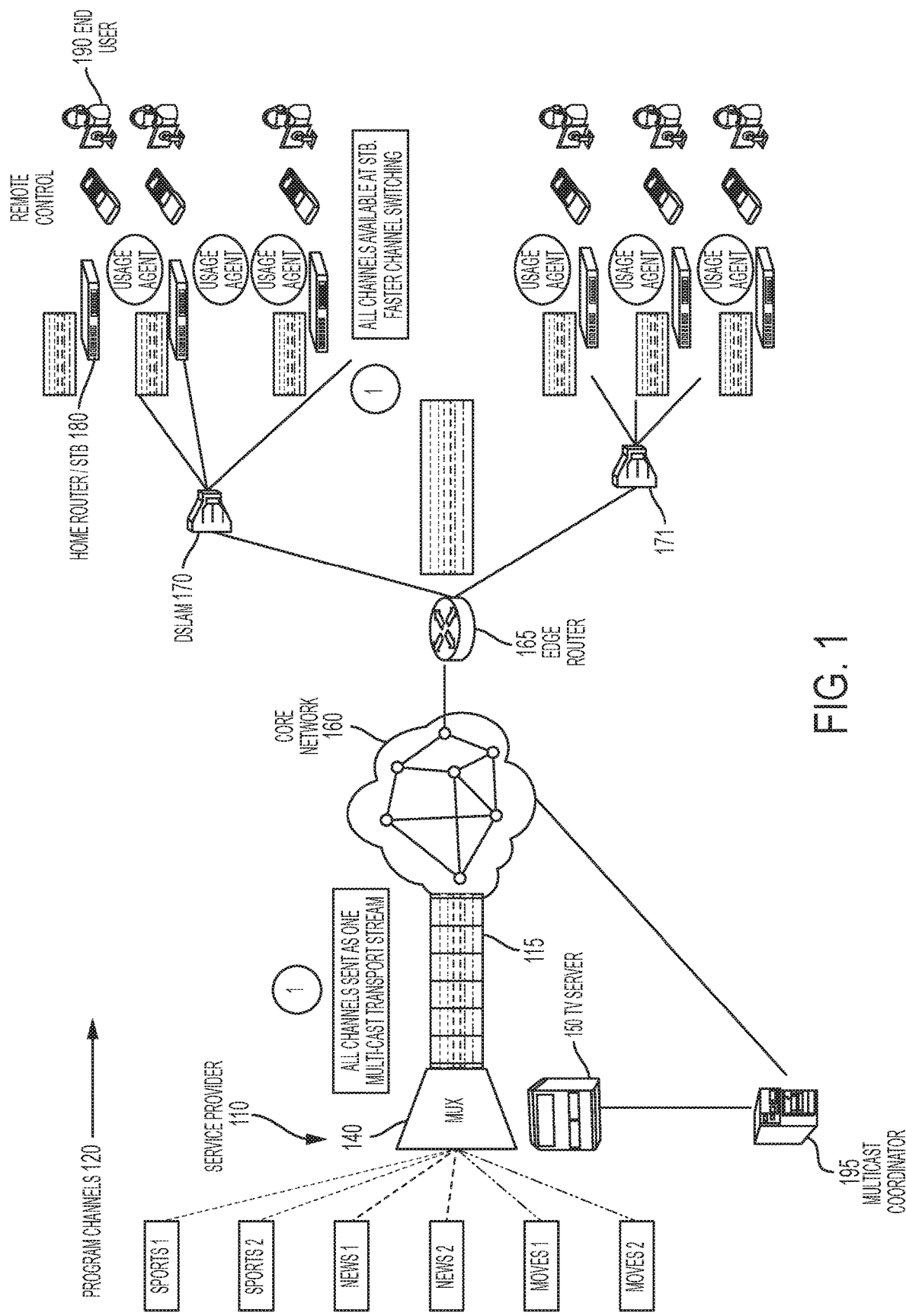
FIG. 1 depicts a system for packaging and distributing channels in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the current approaches package and distribute electronic signals over a data network in order to implement Internet Protocol television (IPTV) and video conferencing technologies. The data network can be an internet-protocol-based (IP-based) data network.

Each IPTV television channel can be distributed over the data network as a number of elementary data streams of video, audio, and/or other information. For example, the current approaches can distribute the television channels (and the programs of each television channel) as electronic signals on the data network using MPEG transport streams (MPEG-TS). Each video conference channel can also be distributed over the data network as a number of elementary data streams of video, audio, and/or other information.

The current approaches can distribute each television program channel (and the programs of each television channel) to the end users using multicast streams. If a program channel is distributed within a multicast stream, then the program channel is "packaged" within the multicast stream. When transmitting program/channel data using a multicast stream, a single source transmits the data to a plurality of end users. This one-to-many mapping between the source and the end users of a multicast stream can be represented as a multicast tree of the multicast stream.

With a first possible configuration, the number of multicast streams can be minimized by transmitting all the television channels (and the programs of each television channel) using the same multicast stream to all the end users. This first configuration uses only one multicast stream and thus reduces an amount of signaling overhead because each multicast stream that is used to transmit channels/programs requires an amount of dedicated signaling overhead. In addition, this first configuration can also decrease a channel zapping time (i.e., the time that is needed by the end user to change channels) because all the channels are readily accessible to the end user by being packaged together in the same multicast stream.

Although this first configuration provides the advantages of reducing signaling overhead and reducing zapping time, this first configuration also has certain drawbacks. As described above, with this first configuration, all end users will receive all channels via the same multicast stream. However, each end user will generally view only a small proportion of the total received channels. As such, this first configuration will distribute a large number of unwatched channels, which corresponds to an inefficient use of bandwidth. Therefore, this first configuration reduces overhead and reduces zapping time at the expense of bandwidth efficiency.

On the other hand, with a second possible configuration, the number of multicast streams can be maximized such that each channel (and the programs of each channel) can be transmitted using a separate multicast stream. With this second configuration, an end user who receives a channel via a corresponding multicast stream is generally a viewer of the channel, which results in a more efficient use of the bandwidth, as compared to the first configuration. However, this second configuration requires an increased amount of signaling overhead. Further, this second configuration also increases the channel zapping time for end users because an end user must switch from one multicast stream to an entirely different multicast stream to change channels. In view of the above, with the current approaches, there is generally a tradeoff between improving network bandwidth efficiency and improving zapping time.

Turning now to an overview of the aspects of the invention, one or more embodiments of the invention address the above-described shortcomings of the current approaches by determining an improved configuration for the IPTV and the teleconferencing multicast streams. The improved configuration can provide satisfactory bandwidth efficiency while also maintaining a satisfactory user experience for the end users. The quality of user experience can be measured in terms of the zapping time that is required to switch between channels, for example. One or more embodiments of the present invention can be directed to a method that adaptively configures multicast streams (and their corresponding multicast trees) to improve bandwidth efficiency while also ensuring a satisfactory switching delay and a reduced signaling overhead.

One or more embodiments of the present invention can dynamically optimize the configuration of multicast streams (and their corresponding multicast trees) based on a set of metrics relating to viewing/usage tendencies of the end users (i.e., "usage metrics") and/or a set of metrics relating to the network (i.e., "network metrics"). In general, each end user has a fairly predictable set of channel-viewing tendencies and/or a fairly predictable television schedule. The end user's viewing tendencies and/or viewing schedule can be based around a broadcasted television show, a type of movie genre, and/or a type of sporting event, for example.

One or more embodiments of the present invention can configure user profiles for the end users where each user profile reflects which channels are watched, at what time, and in what order, by the corresponding end user. By referring to the information reflected within the user profiles, one or more embodiments can determine which channels are likely to be viewed by which end users. One or more embodiments can then dynamically configure the multicast streams to distribute channels based at least on the determined viewing tendencies. With regard to video conferencing, end users who use video conferencing can have their preferred video conferencing channels reflected within their corresponding user profiles.

One or more embodiments of the present invention can receive metrics relating to a plurality of program channels. The received metrics can include usage metrics and/or network metrics, as described in more detail below. As described in more detail below, usage metrics can be received by a set-top box or at a video-conferencing client of the end user. Examples of usage metrics include, but are not limited to, metrics relating to channel selection, an average viewing time per channel, a number of channel switches, and/or an average channel switch time. As described in more detail below, network metrics generally refer to multicast metrics as well as other network-level metrics. Examples of network metrics can include, but are not limited to, metrics relating to a type-P multicast instantaneous hop one-way delay, an average multicast setup time per group, and/or a bandwidth usage efficiency. With one or more embodiments of the present invention, other combined network/usage metrics such as, for example, an average channel selection coverage can also be determined.

In view of the above, one or more embodiments of the present invention adaptively modify configurations of multicast streams (and their corresponding multicast trees) in order to improve a bandwidth efficiency and in order to also maintain a satisfactory user experience for the end users. One or more embodiments can configure the multicast streams based on monitored metrics that are reflected within profiles of the end users. Once the multicast streams are modified, one or more embodiments of the present invention can then transmit channels via the modified multicast streams to the end users.

Turning now to a more detailed description of aspects of the present invention, FIG. 1 depicts a system for packaging and distributing channels in accordance with one or more embodiments. Service provider 110 can distribute IPTV television program channels 120. Service Provider 110 can distribute program channels 120 to end users 190. Program channels 120 can include Sports 1, Sports 2, News 1, News 2, Movies 1, and Movies 2 channels, for example. Service provider 110 can distribute each of the program channels 120 as a group of data streams (i.e., audio, video, and/or information streams, for example). The streams of the program channels 120 can be input into a multiplexer 140, and TV server 150 can control multiplexer 140 to determine which streams (of program channels 120) should be packaged/grouped within each multicast transport stream. Multicast coordinator 195 can provide instructions for controlling TV server 150 and multiplexer 140, as described in more detail below.

In the example of FIG. 1, the multicast coordinator 195 and TV server 150 can initially control multiplexer 140 to package/distribute all data streams of all program channels 120, along with an Electronic Program Guide (EPG), in one multicast transport stream 115 (corresponding to a single multicast tree). As such, all program channels 120 are initially transmitted to all end users 190 using one multicast stream 115.

With one or more embodiments, service provider 110 transmits multicast transport stream 115 to set top boxes 180 of the end users 190. Service provider 110 can transmit multicast transport stream 115 to set top boxes 180 through a core network 160, an edge router 165, and/or digital subscriber line access multiplexers (DSLAMs) (170 and 171).

With this initially-configured multicast transport stream 115, each end user 190 can switch quickly between channels because all channels are available at each end user's STB 180 (because all channels have been provided to all end users using the single multicast tree of multicast transport stream 115). However, with this initial configuration, because each end user 190 will generally only watch a small proportion of the total number of transmitted channels, this initial configuration uses bandwidth inefficiently.

Figure 2:
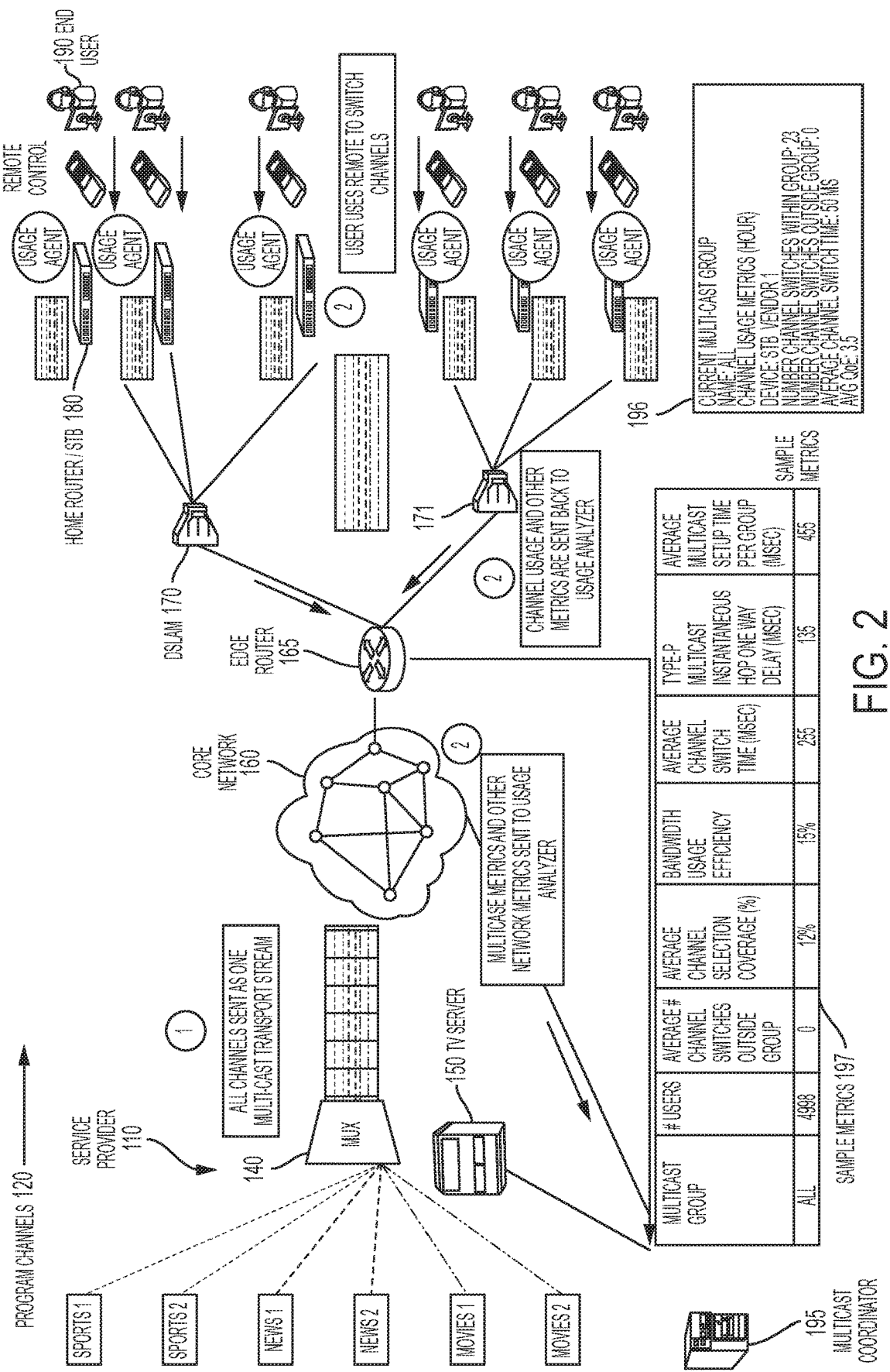
FIG. 2 depicts the system collecting metrics in accordance with one or more embodiments.

FIG. 2 depicts the system collecting metrics in accordance with one or more embodiments. STBs 180 collect usage metrics that reflect the viewing activity of end users 190, and STBs 180 send the usage metrics to multicast coordinator 195. As described above, STBs 180 can collect usage metrics 196 relating to, for example, a number of channel switches within a group, a number of channel switches outside a group, an average channel switch time, and/or an average quality of experience measurement, for example. A "group" can be defined as a plurality of channels that have been packaged together in a multicast stream. Channel switches within a group can refer to switching from a first channel to a second channel where both the first channel and the second channel belong to the same group. Channel switches outside a group can refer to switching from a first channel to a second channel where the first channel and the second channel do not belong to the same group.

Referring to FIG. 2, one or more embodiments can also gather and transmit network metrics 197 relating to the use of the network. As described above, examples of network metrics 197 can include, but are not limited to, an average number of channel switches outside a group, an average channel selection coverage, a bandwidth usage efficiency, an average channel switch time, a type-P multicast instantaneous hop one way delay, and/or an average multicast setup time per group, for example.

Figure 3:
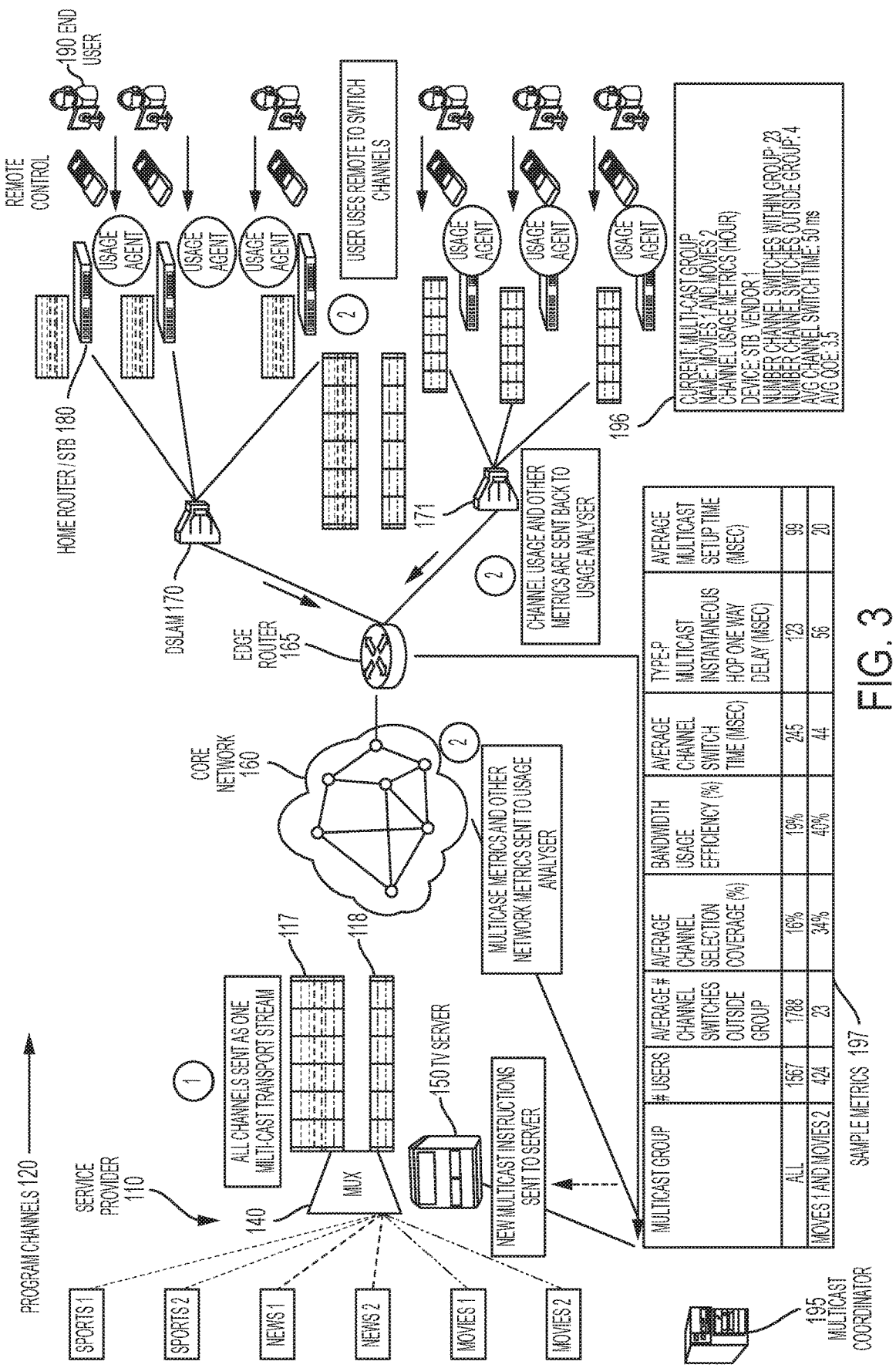
FIG. 3 depicts modifying multicast groups that are used to distribute channels, and further collecting metrics, in accordance with one or more embodiments.

FIG. 3 depicts modifying multicast groups that are further used to distribute channels, and further collecting metrics, in accordance with one or more embodiments. As described above, multicast coordinator 195 receives and analyzes metrics (196 and/or 197). With one or more embodiments, multicast coordinator 195 can analyze the metrics to determine the multicast streams/groups to configure that will improve bandwidth efficiency while also maintaining a satisfactory user experience. For example, one or more embodiments can seek to improve bandwidth efficiency while maintaining a predetermined level of user satisfaction (by having the average channel switch time not exceed a certain predetermined length of time, for example). Other embodiments can seek to improve user experience while maintaining a satisfactory bandwidth efficiency (by having the bandwidth efficiency not fall below a certain predetermined threshold, for example). Based on the analysis performed by the multicast coordinator 195, multicast coordinator 195 can transmit new/updated instructions to TV server 150 for configuring the new/modified multicast streams. By applying these new/updated instructions, TV server 150 controls multiplexer 140 to adaptively configure the group of channels for each multicast stream (and corresponding multicast trees) based upon the received metrics. As such, one or more embodiments adaptively configure new or modified groups of channels for multicast streams and then distribute channels via these multicast streams.

In the example of FIG. 3, multiplexer 140 has configured two multicast groups, which correspond to two different multicast streams. A first multicast group is packaged within multicast stream 117, and the first multicast group includes all program channels 120 (i.e., Sports 1, Sports 2, News 1, News 2, Movies 1, and Movies 2). A second multicast group is packaged within multicast stream 118, and the second multicast group includes only two channels of program channels 120 (i.e., Movies 1 and Movies 2). Edge router 165 can transmit first multicast stream 117 to a first group of end users (i.e., the end users connected to DSLAM 170) and can transmit second multicast stream 118 to a second group of end users (i.e., the end users connected to DSLAM 171). STBs 180 can then continue to collect usage metrics 196 which reflect usage of the two multicast streams (117 and 118). Multicast coordinator 195 can also collect network metrics 197. Multicast coordinator 195 can perform further analysis on the metrics, and multicast coordinator 195 can further instruct multiplexer 140 to adaptively modify the multicast groups.

The process illustrated in FIGS. 1-3 can be repeated. Over time, multicast coordinator 195 can adaptively group one or more channels into different multicast groups in order to achieve a more optimal multicast performance and bandwidth efficiency, while also maintaining a satisfactory user experience.

Figure 4:
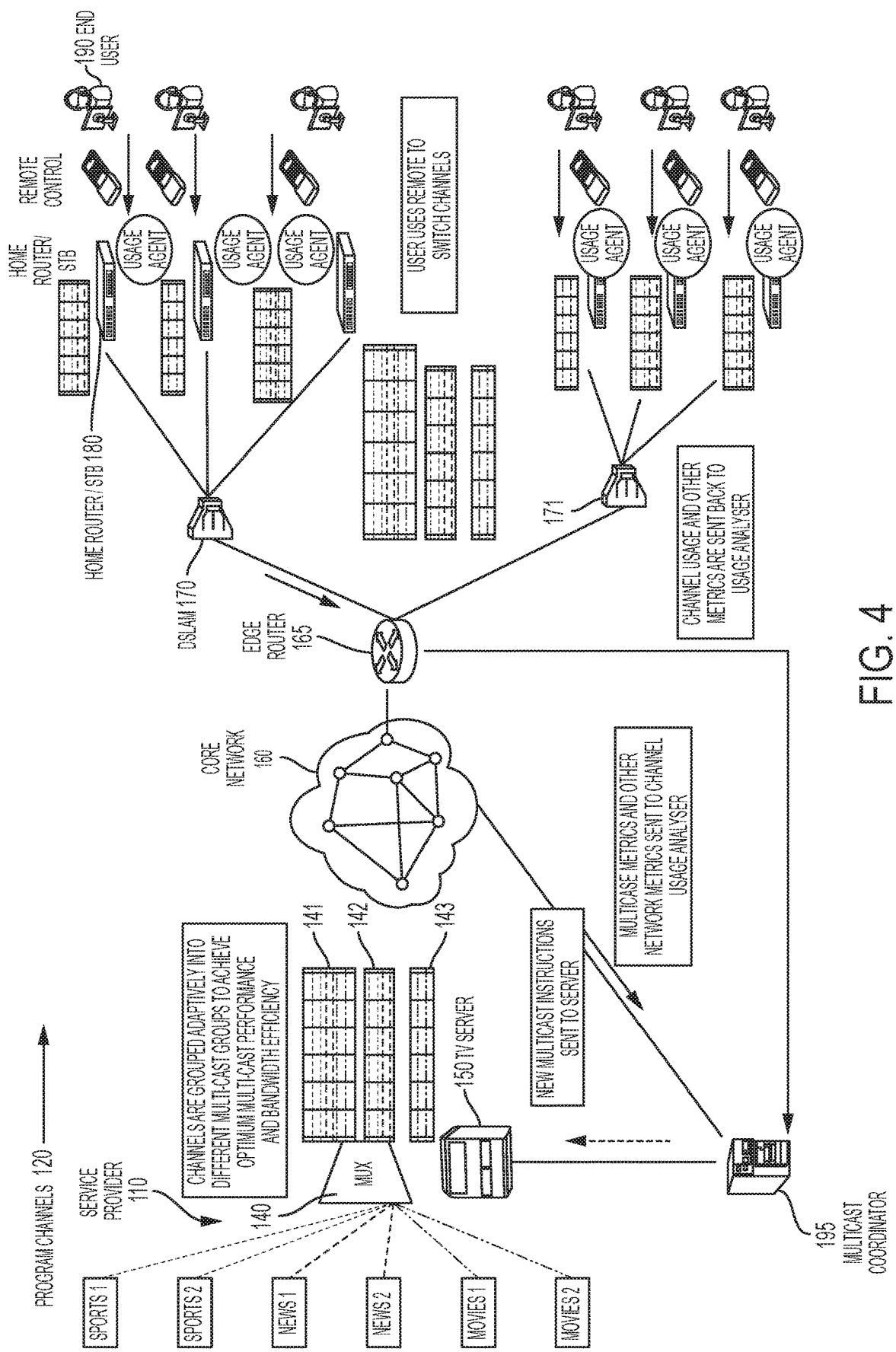
FIG. 4 depicts further modifying the multicast groups that are used to distribute channels, and further collecting metrics, in accordance with one or more embodiments.

FIG. 4 depicts further modifying the multicast groups that are used to distribute channels, and further collecting metrics, in accordance with one or more embodiments. In the example of FIG. 4, multiplexer 140 has configured three multicast groups, which are transmitted within three multicast streams (141, 142, and 143). For example, a first multicast group (corresponding to multicast stream 141) includes all program channels 120. A second multicast group (corresponding to multicast stream 142) includes Sports 1, Sports 2, News 1, and News 2. A third multicast group (corresponding to multicast stream 143) includes Movies 1 and Movies 2. Program channels 120 are then distributed to end users 190 via the multicast streams (141, 142, and 143). Edge router 165 and/or core network 160 can then transmit metrics to multicast coordinator 195.

In view of the above, one or more embodiments are directed to a smarter and more efficient IPTV/video conferencing channel multiplexing mechanism, which enables a more optimal bandwidth efficiency and end user experience. As described above, one or more embodiments perform switching between small multicast trees and large multicast trees. The multicast tree configurations are adaptively modified to maintain a more optimal network and end user experience.

Figure 5:
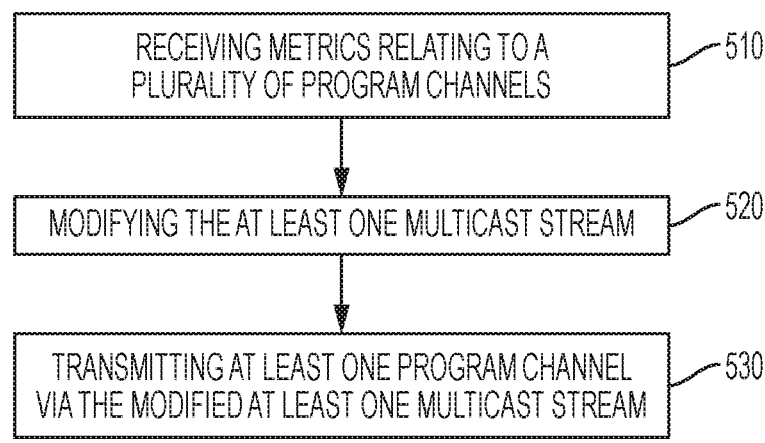
FIG. 5 depicts a flowchart of a method in accordance with one or more embodiments of the invention.

FIG. 5 depicts a flowchart of a method in accordance with one or more embodiments of the present invention. In one or more embodiments of the present invention, the method can be performed by a television server, a multicast coordinator, and/or a core network device, for example. The method includes, at block 510, receiving metrics relating to a plurality of program channels. The plurality of program channels are distributed via at least one multicast stream. The method includes, at 520, modifying the at least one multicast stream. The modifying is based at least on the received metrics. The modifying changes which programs are distributed via the at least one multicast stream. The method includes, at 530, transmitting at least one program channel via the modified at least one multicast stream.

Figure 6:
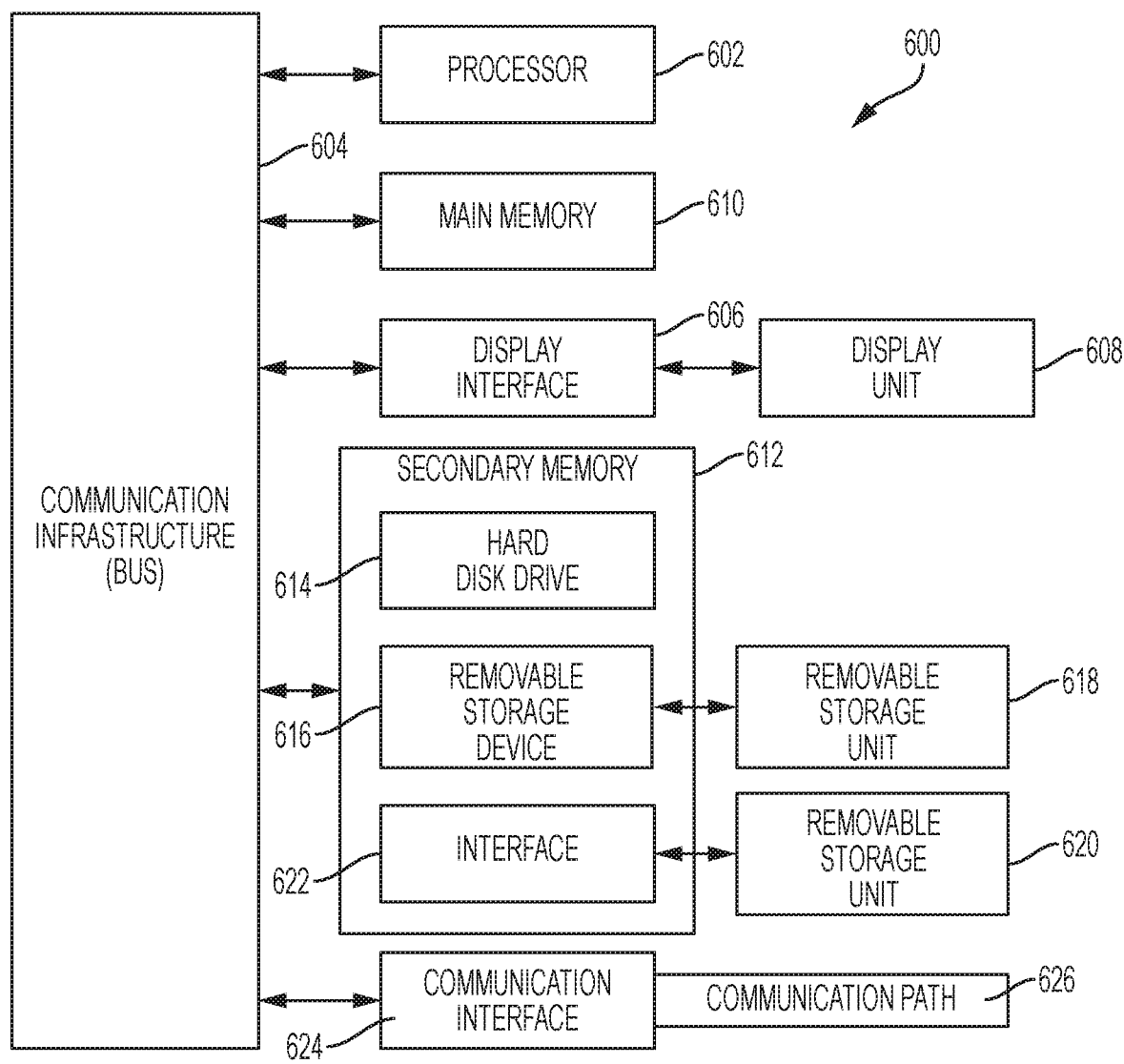
FIG. 6 depicts a high-level block diagram of a computer system, which can be used to implement one or more embodiments of the invention.

FIG. 6 depicts a high-level block diagram of a computer system 600, which can be used to implement one or more embodiments of the invention. Computer system 600 can correspond to, at least, a TV server, a multicast coordinator, and/or a core network device, for example. Computer system 600 can be used to implement hardware components of systems capable of performing methods described herein. Although one exemplary computer system 600 is shown, computer system 600 includes a communication path 626, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 626, e.g., to communicate data between them.

Computer system 600 includes one or more processors, such as processor 602. Processor 602 is connected to a communication infrastructure 604 (e.g., a communications bus, cross-over bar, or network). Computer system 600 can include a display interface 606 that forwards graphics, textual content, and other data from communication infrastructure 604 (or from a frame buffer not shown) for display on a display unit 608. Computer system 600 also includes a main memory 610, preferably random access memory (RAM), and can also include a secondary memory 612. Secondary memory 612 can include, for example, a hard disk drive 614 and/or a removable storage drive 616, representing, for example, a floppy disk drive, a magnetic tape drive, or an optical disc drive. Hard disk drive 614 can be in the form of a solid state drive (SSD), a traditional magnetic disk drive, or a hybrid of the two. There also can be more than one hard disk drive 614 contained within secondary memory 612. Removable storage drive 616 reads from and/or writes to a removable storage unit 618 in a manner well known to those having ordinary skill in the art. Removable storage unit 618 represents, for example, a floppy disk, a compact disc, a magnetic tape, or an optical disc, etc. which is read by and written to by removable storage drive 616. As will be appreciated, removable storage unit 618 includes a computer-readable medium having stored therein computer software and/or data.

In alternative embodiments of the invention, secondary memory 612 can include other similar means for allowing computer programs or other instructions to be loaded into the computer system. Such means can include, for example, a removable storage unit 620 and an interface 622. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 620 and interfaces 622 which allow software and data to be transferred from the removable storage unit 620 to computer system 600.

Computer system 600 can also include a communications interface 624. Communications interface 624 allows software and data to be transferred between the computer system and external devices. Examples of communications interface 624 can include a modem, a network interface (such as an Ethernet card), a communications port, or a PC card slot and card, a universal serial bus port (USB), and the like. Software and data transferred via communications interface 624 are in the form of signals that can be, for example, electronic, electromagnetic, optical, or other signals capable of being received by communications interface 624. These signals are provided to communications interface 624 via a communication path (i.e., channel) 626. Communication path 626 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 610 and secondary memory 612, removable storage drive 616, and a hard disk installed in hard disk drive 614. Computer programs (also called computer control logic) are stored in main memory 610 and/or secondary memory 612. Computer programs also can be received via communications interface 624. Such computer programs, when run, enable the computer system to perform the features discussed herein. In particular, the computer programs, when run, enable processor 602 to perform the features of the computer system. Accordingly, such computer programs represent controllers of the computer system. Thus it can be seen from the foregoing detailed description that one or more embodiments provide technical benefits and advantages.

Figure 7:
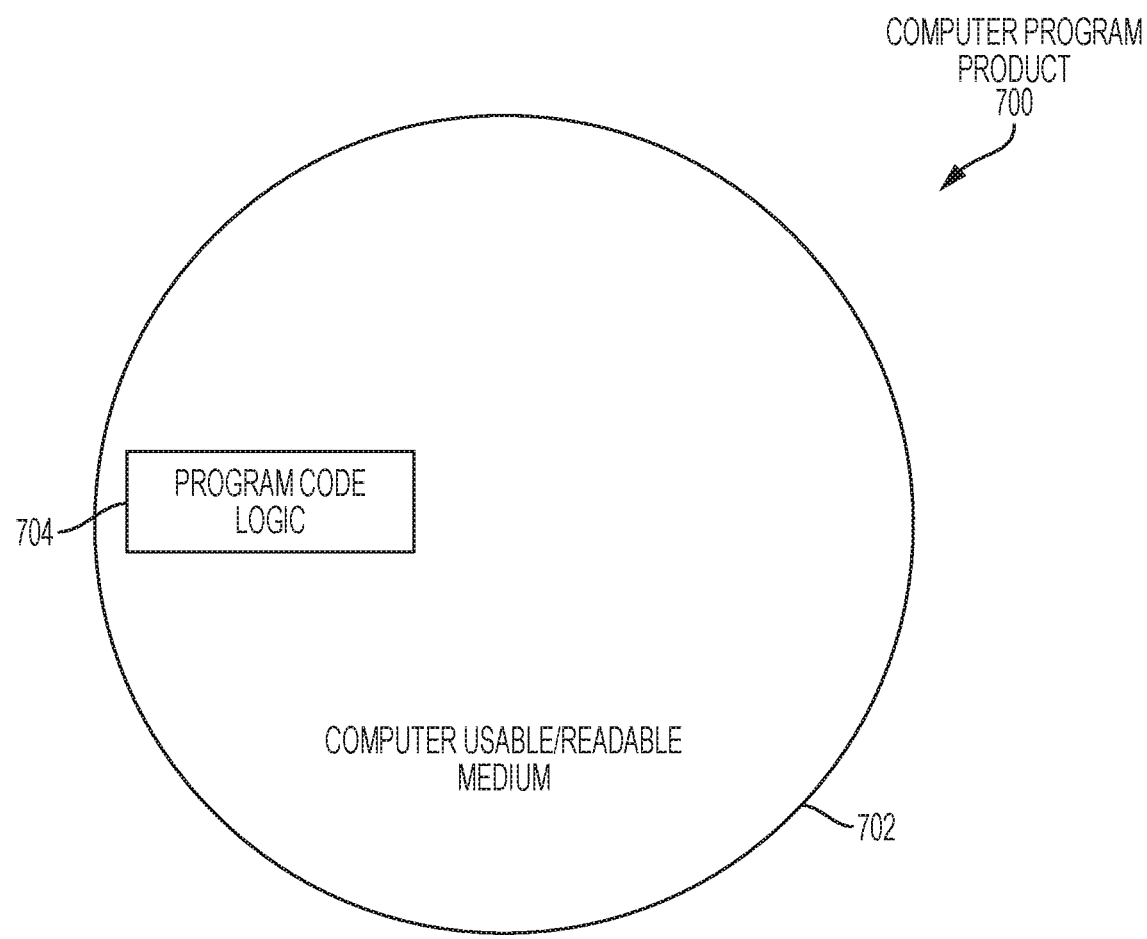
FIG. 7 depicts a computer program product in accordance with one or more embodiments of the invention.

FIG. 7 depicts a computer program product 700, in accordance with an embodiment. Computer program product 700 includes a computer-readable storage medium 702 and program instructions 704.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method comprising:
    receiving, by a processor, metrics relating to a plurality of program channels, wherein the plurality of program channels are distributed across a network in groupings of channels each consisting of a subset of the plurality of program channels with each grouping being transmitted in a multicast stream and wherein the receiving comprises receiving metrics corresponding to a number of channel switches outside of the program channels of a grouping of at least one multicast stream;
    receiving network metrics relating to the network, the network metrics including an average channel selection coverage, a bandwidth usage efficiency, an average channel switch time, and an average multicast setup time per grouping of channels;
    modifying, by the processor, the at least one multicast stream, wherein the modifying is based at least on the received metrics and the network metrics, and the modifying changes which programs are included in the subset of the plurality of program channels distributed via the at least one multicast stream; and
    transmitting at least one program channel via the modified at least one multicast stream.

2. The computer-implemented method of claim 1, wherein the transmitting comprises transmitting the plurality of program channels to a plurality of end users, and the modifying causes an increased bandwidth efficiency or a reduction of channel switch time that is experienced by the plurality of end users.

3. The computer-implemented method of claim 1, wherein the receiving comprises receiving metrics corresponding to a channel switch time.

4. The computer-implemented method of claim 1, further comprising transmitting all program channels in a single multicast stream, wherein the transmitting all program channels occurs before the receiving, the modifying, and the transmitting at least one program channel.

5. The computer-implemented method of claim 1, wherein the modifying comprises configuring a multiplexer to change which programs are distributed via the at least one multicast stream.

6. The computer-implemented method of claim 1, wherein the receiving and the modifying are performed by a multicast coordinator device.

7. A computer-implemented method comprising:
    receiving, by a processor, metrics relating to a plurality of program channels, wherein the plurality of program channels are distributed across a network in groupings of channels each consisting of a subset of the plurality of program channels with each grouping being transmitted in a multicast stream and wherein the metrics include a number of channel switches outside of the grouping of channels of at least one multicast stream;
    receiving network metrics relating to the network, the network metrics including an average channel selection coverage, a bandwidth usage efficiency, an average channel switch time, and an average multicast setup time per grouping of channels;
    modifying, by the processor, the at least one multicast stream, wherein the modifying is based at least on the received metrics and the network metrics, and the modifying changes which programs are included in the grouping of channels distributed via the at least one multicast stream;
    transmitting at least one program channel via the modified at least one multicast stream; and
    transmitting all program channels in a single multicast stream, wherein the transmitting all program channels occurs before the receiving, the modifying, and the transmitting at least one program channel.

* * * * *